UNITED STATES PATENT OFFICE.

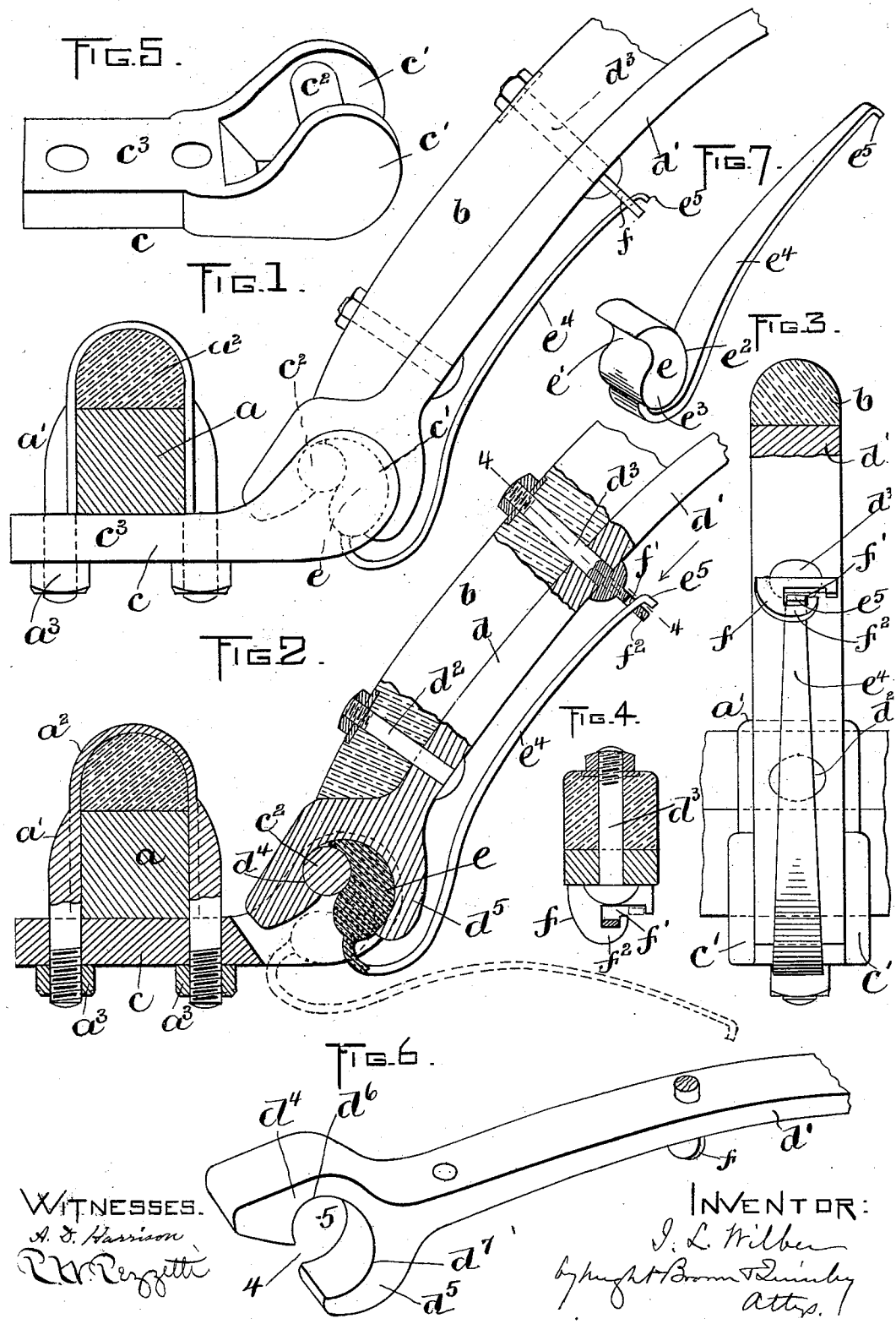

ISAAC L. WILBER, OF BOSTON, MASSACHUSETTS.

THILL-COUPLING.

SPECIFICATION forming part of Letters Patent No. 633,104, dated September 12, 1899.

Application filed July 16, 1898. Serial No. 686,138. (No model.)

*To all whom it may concern:*

Be it known that I, ISAAC L. WILBER, of Boston, in the county of Suffolk and State of Massachusetts, have invented certain new and useful Improvements in Thill-Couplings, of which the following is a specification.

This invention has relation to thill-couplings, and has for its object to provide a device of the class named by means of which the shafts may be readily detached from the axle without the necessity of removing nuts or screws or employing a wrench or other tool.

Another object of the invention is to provide the coupling with means whereby the wear of the contiguous parts will be taken up or compensated for and the members will be prevented from rattling and to reduce the number of parts thereof to the minimum, whereby the expense of manufacturing the same will be greatly lessened and the structure simplified.

Still another object of the invention is to so construct a coupling that the members thereof which work one within the other will be substantially guarded from accumulations of dirt and dust and to arrange the said parts whereby in drawing the vehicle forward or in backing it the members will not be able to move relatively to each other, but will bear against unyielding abutments.

To these ends the invention consists of a coupling possessing certain features of construction and relative arrangement of parts, all as illustrated upon the drawings and now to be described in detail and finally pointed out in the claims hereunto appended.

Of the drawings, Figure 1 represents in side elevation my improved coupling, together with a portion of the shaft and the axle. Fig. 2 represents a partial longitudinal section through the same. Fig. 3 represents a front elevation of the same. Fig. 4 represents a section on the line 4 4 of Fig. 2. Fig. 5 represents in perspective view the coupling member which is attached to the axle. Fig. 6 represents a similar view of the member which is attached to the shaft or thill. Fig. 7 represents a perspective view of the compensating device which is inserted between the members for taking up wear and preventing rattling.

Referring to the drawings, $a$ indicates, in cross-section, an axle to which one of the members $c$ is attached, and $b$ represents a portion of the shaft or thill to which the other member $d$ is attached. The member $c$ is secured to the axle by the usual yoke or clip $a'$, which has its ends passed through the said member and threaded to receive nuts $a^2 a^2$. The said member $c$ is provided with two forwardly-projecting arms $c' c'$, which are extended upwardly and are of the shape shown in Fig. 2. Between the said arms extends a pintle $c^2$, which, as shown in the last-mentioned figure, is located substantially above the top surface of the main portion $c^3$ of the said member $c$. The member $d$, of which one is secured to each of the thills, is provided with an elongated shank $d'$, through which bolts $d^2 d^3$ are passed to secure it in place. The operative end of this member, which extends beyond the end of the thill, is bifurcated or forked to form two arms $d^4 d^5$, of which the former extends down on the rear of the pintle $c^2$, between it and the body $c^3$, and the latter lies in front of the same. The inner side $d^6$ of the arm $d^4$ is curved or socketed to receive the pintle $c^2$, the inner side $d^7$ of the arm $d^5$ being the arc of the circle whose radius is substantially equal to the diameter of the pintle, so that the socket 5, formed by the arms $d^4 d^5$, is provided with a contracted throat 4.

The compensating member $e$, which is inserted between the pintle $c^2$ and the arm $d^5$ of the member $d$, is in the nature of a wedge, resembling in shape one-half of a crescent with the thicker end rounded, as at $e^3$. One side of the wedge is concave or socketed, as at $e'$, to receive the pintle $c^2$ snugly, while the other side $e^2$ is convex and is curved to fit in the concave curved portion of the arm $d^5$, as shown in Fig. 2.

Extending from the thicker end $e^3$ of the compensating concavo-convex member $e$ is a leaf-spring $e^4$, which tapers toward its outer end and which projects first downwardly and then upwardly and forwardly, so as to lie substantially in the direction of the shank $d'$ of the member $d$. The end $e^5$ of the spring is bent at right angles to the remainder thereof, and it is detachably inserted in any suitable fastener, such as $f$, formed on the head of the bolt $d^3$ and having an open-ended bayonet-slot $f'$.

To couple the two members $c$ and $d$ together, the latter is placed with its two arms $d^4$ $d^5$ lying in the front and rear, respectively, of the pintle $c^2$. Then the compensating member $e$ is inserted into the space between the pintle and the arm $d^5$, as shown in dotted lines in Fig. 2, and is rotated about the center of the circle of which the concave curve $d^7$ is an arc, whereby it is tightly wedged between them. The end of the spring $e^4$ is then bent toward the shank $e'$ and is slid into the bayonet-slot $f'$ and engaged with the catch $f^2$ on the lug or fastener $f$. When the parts are in this position, it will be observed that it is impossible to uncouple the members $c$ and $d$, as the throat 4, which leads into the enlarged socket 5, formed by the arms $d^4$ $d^5$, is comparatively narrow or contracted, so that the pintle and the compensating member $e$ firmly lock the member $d$ in place. As the contiguous faces or surfaces of the arm $d^4$, the pintle $c^2$, and the member $e$ become worn the spring $e^4$ forces the member $e$ farther into the wedge-shaped aperture formed by the pintle $c^2$ and the arm $d^5$, the said member $e$ moving in a curve concentric with the convex side thereof.

It will be observed that the arms $c'$ $c'$ overlap the inner edges of the arms $d^4$ $d^5$ of the member $d$, so as to cover the compensating member and prevent access of dust to any space there may be between the said member and the parts with which it is in contact.

It is evident that various changes may be made in the coupling without departing from the spirit and scope of the invention.

Instead of forming the fastening device $f$ on the head of the bolt $d^3$ it may be formed separately therefrom and held in place by the bolt, and while I prefer to employ a fastening having a bayonet-slot, as the spring is not likely to be detached therefrom, inasmuch as the spring must be moved sidewise to disengage it, yet it will be understood that any other kind of fastener may be employed in its place.

It will be seen from the description thus far given that I have provided a very simple coupler, the members of which may be attached and detached in a very small period of time and with the least possible exertion. The members are held firmly against rattling by the compensating member, which automatically moves under the impulse of the spring $d^4$ to compensate for wear of the parts. Moreover, the wedge being forced tightly between the two members, the latter are unable to yield one relatively to the other, and hence the thills bear rigidly against the axle.

Having thus explained the nature of my invention and described a way of constructing and using the same, although without having attempted to set forth all the forms in which it may be embodied or all the modes of its use, I declare that what I claim is—

1. A thill-coupling comprising two members, one having forwardly-projecting arms connected by a pintle, and the other having a bifurcated end adapted to extend between the said arms, said bifurcated end forming an enlarged socket with a contracted throat to receive the said pintle, a concavo-convex wedge provided with a spring bearing directly against its outer end for automatically wedging it between the second said member and the pintle, and a fastener to detachably receive the free end of the spring.

2. A thill-coupling comprising two members, one having a pintle and the other having a shank and an enlarged socket with a contracted throat, a concavo-convex wedge having a spring connected thereto, said spring being curved around the end of the second said member and in the direction of the shank thereof, and a fastener on said shank for detachably receiving the end of the spring.

In testimony whereof I have affixed my signature in presence of two witnesses.

ISAAC L. WILBER.

Witnesses:
A. D. HARRISON,
P. W. PEZZETTI.